March 5, 1929.  H. D. MITCHELL  1,704,334
SHEAR BLADE CORRUGATOR
Filed Oct. 17, 1927   2 Sheets-Sheet 1

INVENTOR.
Harry D. Mitchell,
BY
ATTORNEY

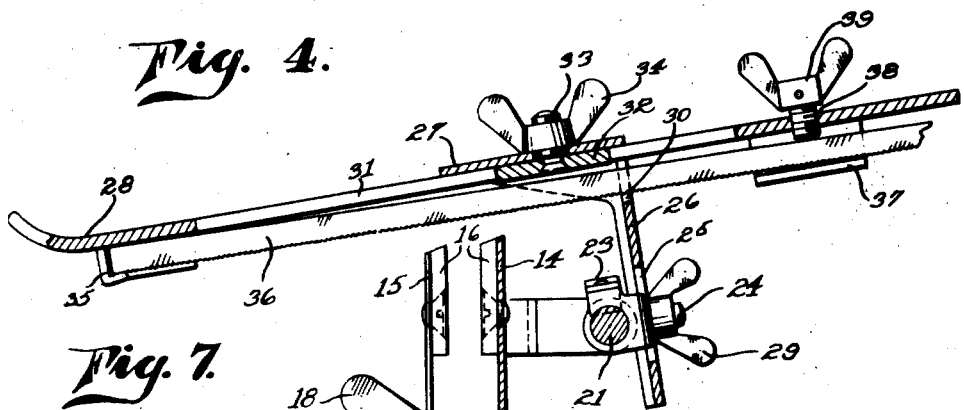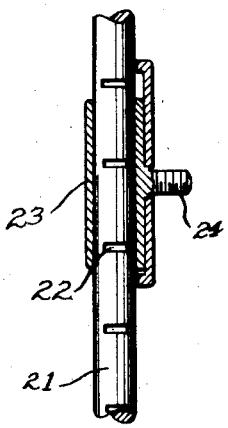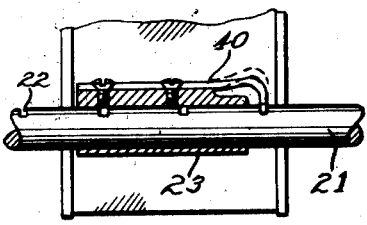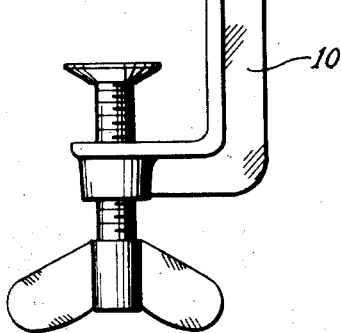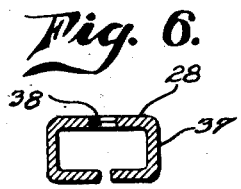

Patented Mar. 5, 1929.

1,704,334

UNITED STATES PATENT OFFICE.

HARRY D. MITCHELL, OF HERMOSA BEACH, CALIFORNIA.

SHEAR-BLADE CORRUGATOR.

Application filed October 17, 1927. Serial No. 226,769.

My invention relates to a machine primarily designed for corrugating barber's shears, and the object thereof is to provide a machine by means of which an unskilled person may be able to corrugate a pair of barber shears as perfectly as the most skilled operator can now do with the devices in use.

Figure 1:
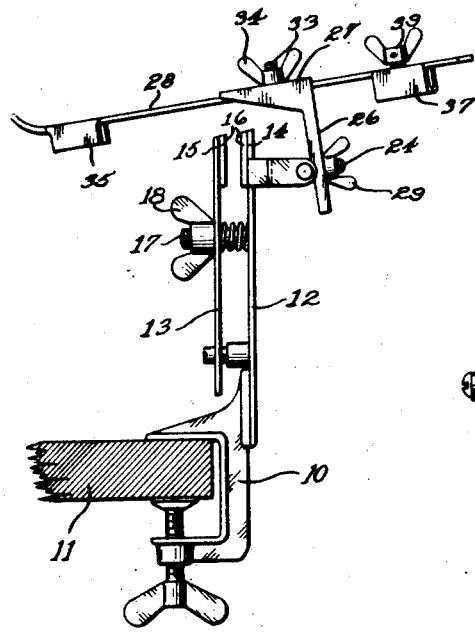
Figure 3:
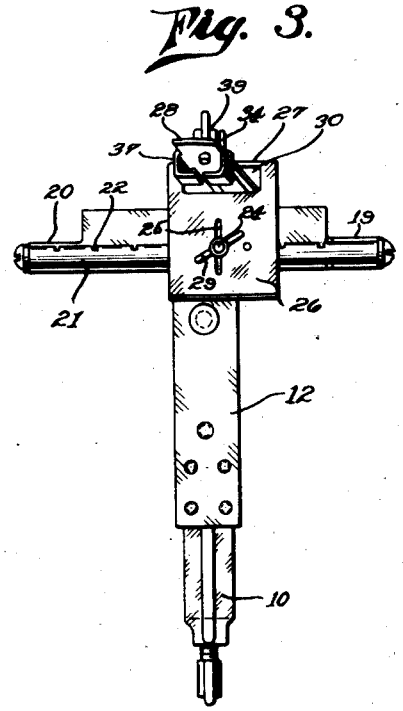
Figure 2:
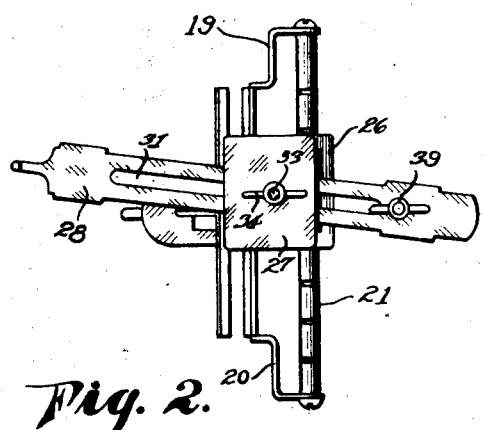
Figure 8:
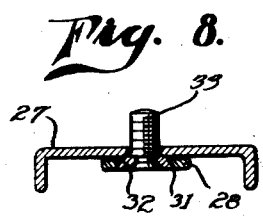

In the drawings forming a part of this application Fig. 1 is a side elevation of my improved machine with the file omitted, Fig. 2 is a top plan of Fig. 1, Fig. 3 is an end view of Fig. 1, Fig. 4 is an enlarged central vertical section with a corrugating file positioned therein. Figs. 5 to 8 are detail views of portions of the machine.

Referring to the drawings a clamp 10 is used for securing the machine to a table or shelf 11. To clamp 10 is secured the fixed member 12 of a vice having a movable member 13. Members 12 and 13 have jaws 14 and 15 which are preferably lined on their opposed faces by wooden strips 16 which prevent the iron jaws of the vice from contacting with the shear blades when being corrugated. A bolt 17 and winged nut 18 provide means to clamp the jaws on the shear blades. From the ends of jaw 14 project brackets 19 and 20 (best shown in Fig. 2) in which is mounted the guide and positioning rod 21 that has positioning notches 22 in one side thereof. Slidably mounted on rod 21 is fitting 23 which has projecting from one side thereof a threaded stud 24, which projects through a slot 25 in the shank 26 of the head 27 of the carrier positioner, in which the file carrier 28 reciprocates and to which it is adjustably secured. Stud 24 is held positioned in slot 25 by wing nut 29, carrier 28 passes through the top of shank 26 in an aperture 30. Carrier 28 is of metal and has a slot 31 therein which is wider at the bottom than at the top (see Fig. 8) in which is received a guide bar 32 on which carrier 28 moves when the shear blades are being corrugated. Bar 32 is adjustably held upon head 27 by screw 33 and wing nut 34. By changing the position of the bar 32 the direction of the reciprocation of carrier 28 is changed so that the direction of the corrugations in the shear blade is likewise changed. At the front end of carrier 28 is a pocket 35 in which the front end of the corrugating file 36 is received. The rear end of file 36 passes through a loop 37 mounted on the rear end of the carrier. In register with loop 37 carrier 28 has a threaded hole 38 in which is received a clamping screw 39 which holds the file positioned for use. File 36 has a line of cuts extending longitudinally the file and other cuts extending angularly to the line of longitudinal cuts. Other forms of files may be used by having other adjustably means for attaching the same to carrier 28 so that a line of cuts of the file shall pass across the shear blade when positioned in the jaws. Attached to fitting 23 is a spring 40 having the free end bent so that when the carrier 28 is positioned for use the free end of the spring will enter a notch in bar 21 and thereby cause the carrier to travel across a particular section of the blade of the shears positioned in the vice. When the carrier is turned on rod 21 so that the end of spring 40 will disengage from a notch in rod 21 the carrier and fitting can be slid along rod 21 so as to cause the spring to engage in another notch in rod 21 when the carrier is brought again into operative position and thereby enable the operator to corrugate a new section of shear blade.

Having described my invention I claim,

A shear blade corrugator, comprising a clamp; a vice secured to said clamp; a positioning rod secured to said vice, said rod having a plurality of notches in one side thereof, a fitting slidingly mounted on said rod; a spring secured to said fitting and having its free end bent to enter a notch in said rod when the corrugator is positioned for use; a carrier positioner adjustably mounted on said fitting; a file carrier slidable through and adjustably mounted on said positioner, and a corrugating file secured to said carrier.

In witness that I claim the foregoing I have hereunto subscribed my name this 7th day of Oct. 1927.

HARRY D. MITCHELL.